3,166,405
PURIFICATION OF GALLIUM
Stanley M. Kulifay, St. Louis, Mo., assignor to Monsanto Company, a corporation of Delaware
No Drawing. Filed Dec. 17, 1962, Ser. No. 244,863
2 Claims. (Cl. 75—84)

This invention relates to an improved process for the purification of gallium metal. More particularly, this invention relates to an acid extraction of undesirable trace metals from gallium by the use of a mixture of nitric and hydrochloric acids preferably diluted in water.

It has previously been a common practice to add dilute nitric acid to a quantity of gallium metal and to shake the acid with the metal in order to extract sodium and other soluble contaminants. Such a procedure leaves the gallium in the form of uncoalesced droplets as well as a dark gray colloidal suspension of gallium. To remedy this, the nitric acid is carefully decanted and the gallium washed with distilled water to remove entrained nitric acid. The metal is then washed with dilute hydrochloric acid causing the droplets to coalesce and clearing the colloidal suspension to some extent. Such a process has the comparative disadvantages of requiring more time and producing less yield than the improved process of this invention.

It is therefore an object of this invention to provide an improved method for the purification of crude gallium metal. Additional objects, benefits, and advantages will become apparent as the detailed description of the invention proceeds.

Broadly the present invention comprises the use of a mixture of nitric and hydrochloric acids, preferably diluted with water, to dissolve sodium, zinc, cadmium and other soluble impurities preferentially from either a crude or refined quantity of gallium metal. I have discovered that by using this method, the details of which are subsequently set forth in this disclosure, I am able to achieve not only increased removal of certain objectionable impurities in less time than formerly possible but also an increased yield of the purified gallium.

During the practice of a prior art method, difficulties were encountered in the conventional method of acid extraction using successive treatments of nitric and hydrochloric acids. In this prior art process, dilute $HNO_3$ (1 part concentrated $HNO_3$:2 parts $H_2O$) was added to a liquefied quantity of gallium (M.P. 30° C.). This caused the immediate formation of a dark gray colloid. The acid and metal were shaken vigorously for one minute periods with frequent venting and allowed to stand for five minutes. This procedure was continued for thirty minutes, at which time no further reaction was observed. At this point the gallium was present in the form of the gray colloid previously mentioned and small uncoalesced droplets. This solution and gallium metal were then cooled in an ice bath in an attempt to solidify the gallium but with no success. The gallium was finally solidified in a Dry Ice and acetone bath. There still remained a persistent gray colloid and some uncoalesced droplets. The nitric acid solution was carefully decanted and the gallium was rinsed twice with water to remove traces of the acid. To the gallium was then added a dilute HCl solution, and a shaking, freezing, and melting cycle was followed until all the gallium had coalesced except for a small quantity of the gray colloid. The HCl solution was decanted and the gallium was then rinsed twice with water and stored.

In the practice of my invention, a dilute solution of a nitric-hydrochloric acid mixture is used as an extractant instead of $HNO_3$. Upon adding the acid to the molten gallium, almost none of the gray colloid formed and the gallium was in the form of much larger droplets. After a 20 minute period of shaking and settling as described above, the gallium had coalesced well and the gray colloid was not present in any significant amount. After freezing with Dry Ice and acetone and washing the purified gallium, it was weighed and analyzed. A comparison of analyses with the sample treated successively with $HNO_3$ and HCl showed that the single extraction combining the two acids produced a higher yield of gallium of higher purity than did the $HNO_3$ extraction followed by the HCl extraction.

The range of proportions and concentrations of the acids can vary widely and still remain within the scope of this invention. The ratio of the $HNO_3$ and HCl to each other in the original acid mixture does not require sharply defined limits. However to receive the maximum benefit from the active free-chlorine-bearing properties of aqua regia, a mixture of approximately 5 parts HCl and 1 part $HNO_3$ is recommended. Nevertheless other mixtures, such as 1 part HCl to 10 parts $HNO_3$, 2 parts HCl to 1 part $HNO_3$, and 20 parts HCl to 1 part $HNO_3$, will also accomplish the objects of this invention, namely higher and purer yields of gallium than formerly possible. The ultimate concentration of the acid solution is likewise not a factor which need be sharply delineated. An undiluted acid mixture may be used as the extractant if care is taken to chill the reaction mixture to control the exothermic reaction which will occur. Also if an acid mixture higher in HCl than the suggested ratio of 5 parts HCl to 1 part $HNO_3$ is used, the reaction will be less violent and require little cooling during the extraction step. On the other hand, an acid solution as dilute as one percent may be used with success if sufficient time is allowed for the extraction step. To practice this invention at room temperature without the necessity for external heating or cooling, a dilution of an acid mixture with water to form a 25–50% solution will provide an extractant of the proper concentration for producing a rapid, controlled extraction. Those skilled in the art will be guided by factors such as ease of coalescence, heat of evolution, degree of purity, percent yield, and time required, in arriving at a proportion and concentration of acids which best suit their needs. An acid mixture which I have found useful for my purposes has been 5 parts HCl:1 part $HNO_3$:12 parts $H_2O$, more commonly referred to as a 33% solution of aqua regia.

The following example illustrates a specific embodiment of the invention and variation in specific details is possible without exceeding the scope of this invention.

EXAMPLE

A quantity of 10 ml. concentrated (15 M) $HNO_3$ was added to 50 ml. concentrated (12 M) HCl. A 5 ml. portion of this acid was added to 10 ml. double-distilled water. This quantity in turn was added to 18.8 grams of crude molten gallium metal which had been weighed by difference into a clean 30 ml. polyethylene bottle. This mixture was shaken vigorously for one minute with frequent venting to release excess pressure caused by the exothermic reaction. At this point the mixture became quite warm and spurted slightly upon venting but the reaction was much less violent than was the case when only $HNO_3$ was used as the extractant. After the one minute of shaking, the mixture was allowed to stand for five minutes. After the mixture had been shaken about three times, it did not reheat on subsequent shaking. The gallium and acid were cooled in ice water, then cooled in a Dry Ice-acetone bath to solidify the gallium. After the acid had been poured off, the gallium was rinsed twice with double-distilled water containing a small amount of HCl (5 or 10 ml./l.), then rinsed again with double-distilled water only. Finally the gallium was rinsed with acetone and dried in an air stream.

Since this process is directed to the removal of trace impurities, it is therefore obvious that only the purest reagents available should be used and that meticulous attention should be given to the cleanliness of the apparatus employed in this method.

Table I provides a comparison of the present method with the prior art nitric acid purification method.

Table I

| Extractant | Zn, p.p.m. | Cd, p.p.m. | Percent yield | Time required for extraction, hour |
|---|---|---|---|---|
| Original sample | 680 | 0.7 | | |
| 1:2 $HNO_3:H_2O$ followed by dilute HCl | 0.2 | 0.5 | 85.6 | 1 |
| 1:2 $HNO_3$—$HCl:H_2O$ | <0.1 | <0.05 | 94.0 | 0.3 |

Although the invention has been described in terms of a specific embodiment which has been set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for purifying gallium comprising contacting liquid gallium with a mixture of nitric and hydrochloric acids, and subsequently removing the acid solution from said gallium.

2. A process according to claim 1 wherein said mixture is a dilute acid mixture.

References Cited in the file of this patent
UNITED STATES PATENTS

| 1,576,083 | Boyer | Mar. 9, 1926 |
| 2,898,278 | Plust | Aug. 4, 1959 |
| 2,927,853 | Merkel | Mar. 8, 1960 |

OTHER REFERENCES

Powell et al.: Journal of Applied Chemistry, December 1, 1951, pp. 541–551.